United States Patent

Mathé et al.

[11] Patent Number: 6,128,373
[45] Date of Patent: Oct. 3, 2000

[54] PROGRAMMABLE DATA ACCESS ARRANGEMENT HAVING COMBINED COMMAND SIGNALS

[75] Inventors: Jacques Mathé, Penvenan; Daniel Jean Pater, Chateau Neuf de Grasse; Wilfrid C. D'Angelo, La Trinité, all of France

[73] Assignee: Conexant Systems, Inc., Newport Beach, Calif.

[21] Appl. No.: 09/075,451

[22] Filed: May 8, 1998

[51] Int. Cl.[7] .................................................. H04M 11/00
[52] U.S. Cl. ...................................... 379/93.29; 379/93.05
[58] Field of Search .............................. 379/93.05, 93.06, 379/93.28–93.37, 387, 398, 399, 402, 405, 413, 419

[56] References Cited

U.S. PATENT DOCUMENTS

| | | | |
|---|---|---|---|
| 5,369,687 | 11/1994 | Farkas | 379/93.05 |
| 5,430,793 | 7/1995 | Ueltzen et al. | 379/93.29 |
| 5,737,397 | 4/1998 | Skinner et al. | 379/93.29 |

FOREIGN PATENT DOCUMENTS

| | | | |
|---|---|---|---|
| 0459279 | 12/1991 | European Pat. Off. | 379/93.29 |
| 0 519 795 A1 | 12/1992 | European Pat. Off. | |

*Primary Examiner*—Wing F. Chan
*Attorney, Agent, or Firm*—Price, Gess & Ubell

[57] ABSTRACT

A universal data access arrangement (DAA) for interfacing a modem with a telephone line which may variably control its parameter settings to meet the interface requirements for telephone networks in various countries. The parameter settings are programmed into the universal DAA by multiple parallel command signals received from a connected modem. Each of the command signals is concurrently transmitted to a plurality of parameter-controlled circuits in the DAA, where each parameter-controlled circuit may interpret the received command signal to correspond to a different parameter setting. This allows different circuits of varying functionality to be separately programmed with different parameter settings using the same command signals received by each of the circuits. A safety barrier device is provided within the DAA in the transmission pathway for each of the multiple parallel command signals, where this arrangement allows parameter command signals to be transmitted through the safety barrier devices and then branched to various parameter-controlled circuitry after passing through the safety barrier devices, thus reducing the number of safety barrier devices required to provide electrical isolation for the modem.

32 Claims, 3 Drawing Sheets

| CALL PHASE | DESCRIPTION |
|---|---|
| 1 | ON HOOK |
| 2 | OFF HOOK: DIAL TONE DETECTION |
| 3 | OFF HOOK: PULSE DIALING<br>PULSE SETUP<br>BREAK / MAKE, BREAK / MAKE ...<br>PULSE CLEAR |
| 4 | CALL PROGRESS<br>CONNECTED |

PROGRAMMABLE DATA ACCESS ARRANGEMENT HAVING COMBINED COMMAND SIGNALS

BACKGROUND OF THE INVENTION

1. Field of the Invention

The present invention relates generally to an improved data access arrangement interfacing a modem with a telephone line, and specifically to a data access arrangement which is programmable to perform according to the different specifications in different countries.

2. Description of the Related Art

In order to transmit digital data between computers over the public switched telephone network (PSTN), modems are used to convert between a computer's digital signals and analog signals that can be carried on the telephone network's analog transmission lines. The subscriber portion of the telephone network (PSTN) has two wires known as "tip" and "ring," which carry information being transferred to and from the subscribers, as well as control signals, such as a ring signal. The modem receives a serial stream of bits as input from a computer and produces a modulated carrier as output, thus converting the digital signals of the computer to analog signals for transmission on the telephone wires. Because modems connect to these conventional telephone wires, they must conform to the requirements of the telephone network (PSTN). A data access arrangement (DAA) is connected as an interface between the modem and the telephone network (PSTN) to ensure the modem is compatible with the telephone network (PSTN).

Telephone companies require that a DAA be placed in series between the telephone wires and all equipment, such as modems, connected to the telephone network (PSTN) in order to isolate the equipment from the telephone network (PSTN). The DAA provides this electrical isolation between modems and the telephone network (PSTN), as well as providing impedance matching, hybrid circuit and sometimes amplification, filtering and control functions. DAAs commonly utilize transformers or optical couplers as safety components to provide such electrical isolation.

The telecommunication interface requirements of the DAA circuit are not governed by one international body. As a consequence, countries have differing requirements that the DAA must meet. Each country uses different specifications and parameter values for its telephone network communications. For example, different countries have different requirements for parameters such as Off-Hook DC loop characteristics and Ring Detection requirements. In pulse dialing, different countries have different values for such parameters as make/break ratio, interdigit gap, pulses per second, and make current value. Each country requires equipment to meets its own specifications and parameter requirements in order to connect to the telephone network of that country. Therefore, a user must have a separate modem tailored for each country in which the user wishes to connect to their telephone network.

It is desirable to produce a DAA which could be used in all of the different countries. One conventional solution to this problem is to use a DAA circuit which is external to the modem. The DAA circuit could then be interchanged with a DAA circuit meeting the requirements of the country in which modem is being used. For instance, the DAA assembly could be formed as an integral part of a cable connecting the modem to the telephone line. Different cables, each including a different DAA circuit, could then be interchangeably used to meet the differing international requirements.

However, this arrangement then requires several cables to be carried along with the modem, so that the cable possessing the particular international requirements needed at the time can be connected to the modem. In an effort to overcome the hassle of carrying multiple cables with varying DAA parameters, U.S. Pat. No. 5,457,601 issued to Georgopulos et al. discloses a modem configured to receive an interchangeable data access arrangement module. This configuration allows different data access arrangement modules to be interchangeably connected to the modem to meet the varying country-specific interface specifications. While the data access arrangement modules are less bulky than external cables, this arrangement similarly has the disadvantage of requiring multiple modules having different data access arrangement specifications be transported along with the modem in order to change the operating characteristics of the data access arrangement.

There have been attempts to provide DAAs which can be programmed to different country specifications using the firmware of the DAAs, so that the particular DAA circuits are not required to be interchanged to accommodate the particular country specifications needed. One such attempt is disclosed in U.S. Pat. No. 5,712,977 issued to Glad et al. which teaches using a universal modem that can be reconfigured to meet different country specifications. The universal modem is configured according to a country identification code input by a user, where the modem includes a memory having a stored relationship between the country identification code and the DAA specifications for that country. The modem includes a microprocessor which retrieves the DAA specifications associated with the country code input by the user and programs the DAA with control data according to those specifications. The microprocessor sends the control data to the DAA as a serial bit stream which is interpreted by the DAA to decipher the control data. This type of DAA, which is formed as a programmable IC, requires intelligent components to process the control data in the serial bit stream. DAAs of this type are active circuits which further require a power supply to drive the programmable DAA. Thus, programming a DAA using a serial bit stream requires an intelligent, programmable IC as well as an active circuit to drive the programmable IC, which adds to the cost and complexity of the DAA.

There is a need for a DAA which can be configured to various country specifications using a passive configuration (i.e., having components which do not require a power source) and which also does not require intelligent components to interpret commands coming from the modem in a serial stream. In order to accomplish these needs, there have been attempts to use dedicated components to produce command signals from the modem to the DAA informing the DAA to operate according to particular parameters. Each dedicated component emits a command signal corresponding to a respective country specification. Such commands from dedicated components are delivered to the DAA is parallel form, so that the DAA does not require intelligent components to interpret the contents of the incoming command. Further, the power for delivering the commands comes from the dedicated components themselves, and the DAA can be formed using a passive circuit configuration.

As discussed above, each country has different requirements for parameters such as Pulse Dialing, Off-Hook D.C. loop characteristics, and ring detection requirements. For example, there are currently two different pulse dialing parameters and four different Off-Hook D.C. loop parameters used by most of the countries in the world. Each DAA includes pulse dialing circuitry operating according to the required pulse dialing parameters for that country as well as D.C. loop circuitry operating according to the necessary D.C. loop characteristics for that country. When using dedicated components to program a DAA to function according to one of the possible operating parameters typically used worldwide, six dedicated components would be required in the above example to deliver two different possible pulse dialing parameters to the pulse dial circuitry and four different possible Off-Hook D.C. loop parameters to the D.C. loop circuitry of the DAA. Since the dedicated components are located in the modem, a safety barrier, such as a transformer or optical coupler, must be respectively positioned in series between each circuit and the modem to provide electrical isolation for all electrical pathways between the telephone network (PSTN) and the modem. Thus, a DAA capable of being programmed for the two different pulse dialing parameters and four different Off-Hook D.C. loop parameters used by most of the countries in the world would require six safety barriers, one for each pulse dialing parameter and D.C. loop parameter. In manufacturing DAAs, approximately 50% of the cost of producing a DAA comes from the cost of the safety barriers themselves. The cost of producing a DAA can be reduced dramatically by reducing the number of safety barriers required by the DAA.

There is a need for a programmable DAA having a passive circuit configuration which reduces by the number of safety barriers required for providing electrical isolation between a modem and the telephone network (PSTN) for signals transmitted from the modem to program the DAA with various possible operating parameters in order to significantly reduce the cost, complexity, and size of the DAA.

SUMMARY OF THE INVENTION

The present invention overcomes the aforementioned shortcomings associated with the prior art by providing a universal DAA allows its parameter values to be selectively programmed to coincide with the requirements of the telephone networks of any country. The operating parameters of the universal DAA are programmed by multiple parallel command signals received from a connected modem. Each of the command signals is conjointly transmitted to a plurality of parameter-controlled circuits in the DAA, where each parameter-controlled circuit interprets the received command signal to correspond to a parameter setting associated with that particular parameter-controlled circuit. This allows different circuits of varying functionality to be separately programmed with different parameter settings with respect to each other using the same command signals received by each of the circuits. A safety barrier device is provided within the DAA in the transmission pathway for each of the multiple parallel command signals. With this arrangement, parameter command signals can be transmitted through the safety barrier devices and then branched to various parameter-controlled circuitry after passing through the safety barrier devices, where each of the various parameter-controlled circuits may interpret the same parameter command signal differently. The programmable DAA includes a fewer number of electrical isolation safety barriers than the number of possible parameter settings which can be input into the DAA. Thus, the present invention reduces the number of safety barrier devices required to provide electrical isolation from the modem.

This configuration of present invention provides a programmable data access arrangement (DAA) having an improved configuration which significantly reduces the cost, complexity, and size of the DAA.

BRIEF DESCRIPTION OF THE DRAWINGS

The features of the present invention, which are believed to be novel, are set forth with particularity in the appended claims. The present invention, both as to its organization and manner of operation, together with further advantages, may best be understood by reference to the following description, taken in connection with the accompanying drawings in which the reference numerals designate like parts throughout the figures thereof and wherein:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a universal data access arrangement (DAA) capable of being programmed with various parameter settings to comply with different country's network interface requirements.

Figure 1:
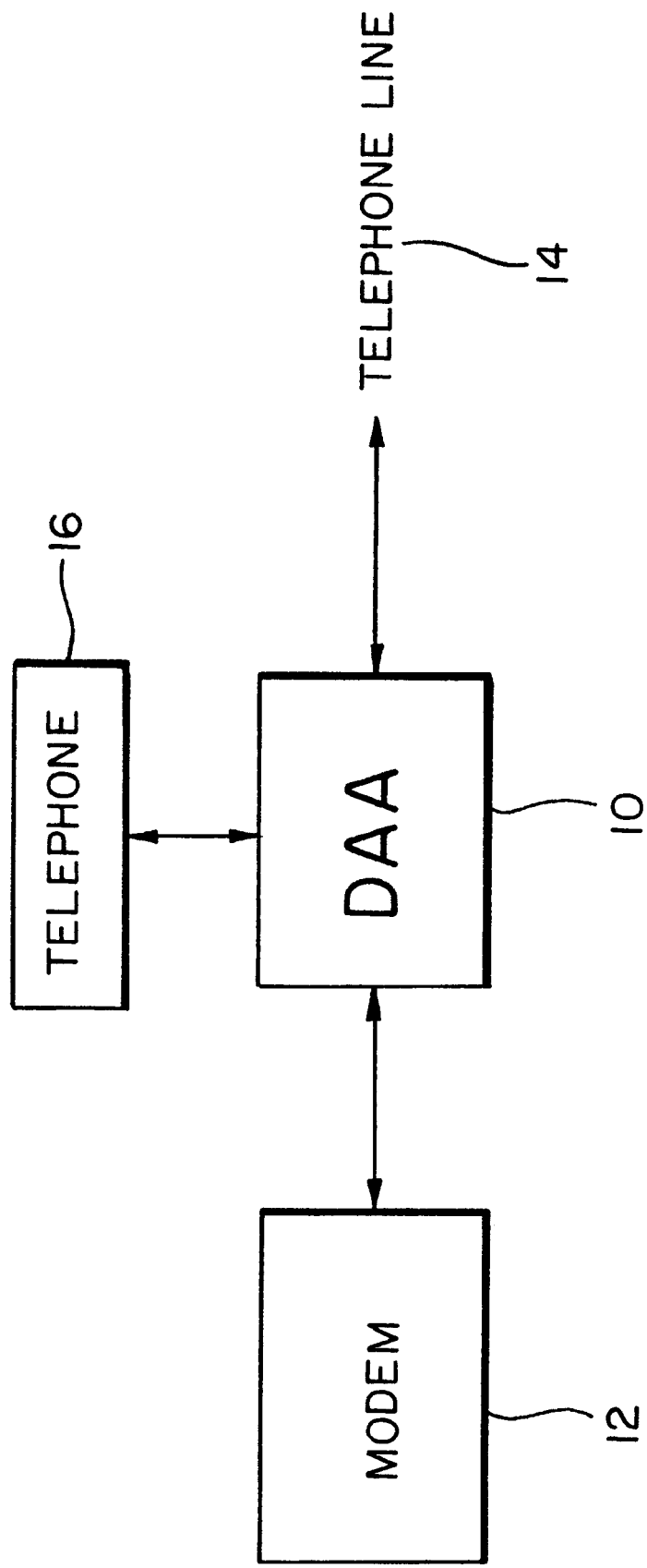
FIG. 1 is a block schematic diagram of a DAA showing its interface between a modem and a telephone line.

Referring now to FIG. 1, a block schematic diagram of a DAA 10 interfacing a modem 12 to the "tip" and "ring" wires of a telephone line 14 is illustrated. It should be understood that the term modem is used herein to encompass modems, facsimile machines, answering machines and other similar telecommunication devices which require an interface to communicate information over a telephone line 14. The DAA 10 further includes the capability for connecting an ordinary voice telephone 16 to the telephone line 14.

At present, modems include DAAs designed to meet the telecommunication interface requirements for the telephone network of only one particular country. Every country requires that a modem connected its telephone network be electrically isolated from the telephone network, where this electrical isolation is provided by safety components situated in the DAA interfacing the modem to the telephone network. Each country uses different specifications and parameter values for its own telephone network communications. The present invention provides a universal DAA 10 which allows its parameter values to be selectively programmed to coincide with the requirements of the telephone networks of any country. The parameters used to program the DAA 10 are transmitted from the modem 12 to the DAA 10, so that the parameter control signals used to program the DAA 10 are required to travel through a safety component in the DAA 10 in accordance with electrical isolation network requirements. The DAA 10 of the present invention minimizes the number of safety components required for each of the various parameter control signals to pass through.

Figure 2:
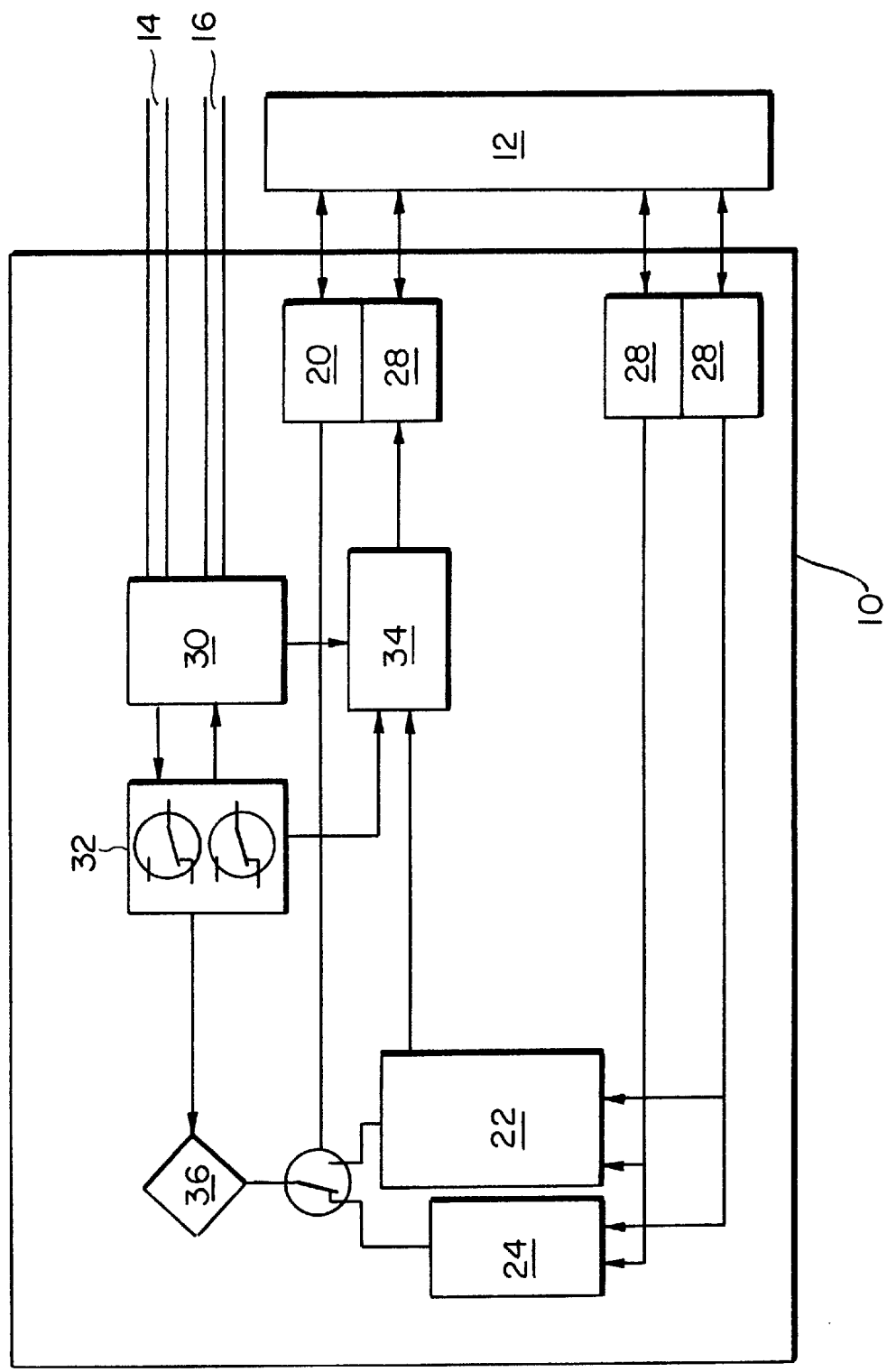
FIG. 2 is a block schematic diagram of a preferred embodiment of the DAA of the present invention.

The structure and operation of a preferred embodiment of the DAA 10 of the present invention is described in greater detail with reference to the schematic block diagram of the DAA 10 in FIG. 2. The modem 12 is connected to the DAA 10 through a plurality of safety components 20. The safety components 20 provide electrical barrier isolation as well as communication between the modem 12 and the DAA 10.

Each safety component 20 preferably comprises an optical coupler, and will be referred to hereinafter as optical coupler 20. However, it is understood that safety component 20 may also comprise a transformer, relay, or other similar device providing the required electrical isolation between the modem 12 and the telephone line 14.

Figure 3:
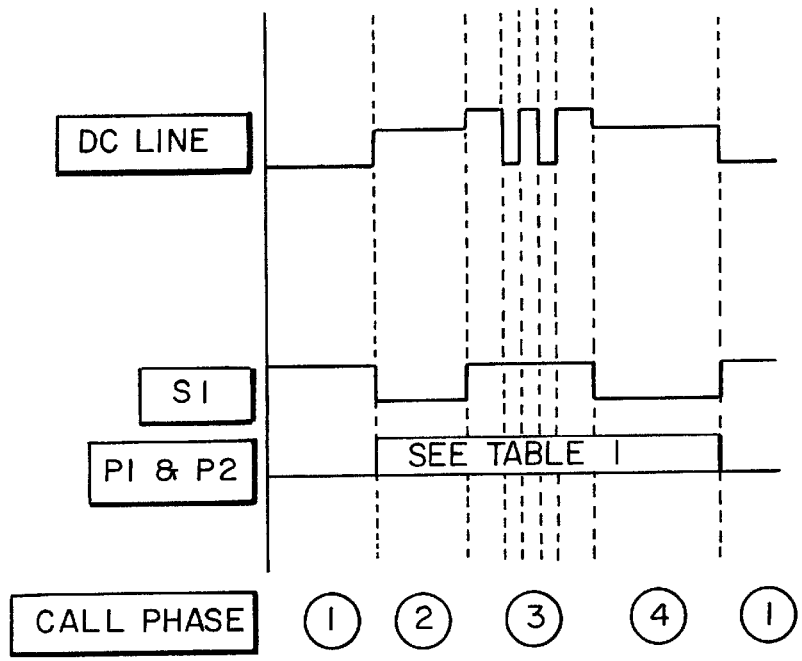
FIG. 3 is a timing diagram of the operating signals of the DAA of the present invention for a pulse dialing call.

The modem 12 will either be in an On-Hook mode or an Off-Hook mode. The operation of the DAA 10 will be described with further reference to FIG. 3, which illustrates the timing sequence of a pulse dialing call in the DAA 10. The modem 12 is Off-Hook while it has established a connection with a remote modem (not shown) connected to the telephone network (PSTN), while a dial tone is being detected from a central office of the telephone network (PSTN), or while pulse dialing to transmit a desire to establish a connection to a remote modem. The modem 12 is On-Hook while it is awaiting a ring signal to be transmitted from a remote modem. The telephone line 14 and voice telephone 16 are connected to the DAA 10 through an analog interface 30 known in the art. The DAA 10 includes a relay 32 which switches the connection of the DAA 10 to the tip and ring wires of the telephone line 14 between the On-Hook mode and the Off-Hook mode. Relay 32 may comprise any type of multiple-contact switch that allows its connection between the contacts to be easily switched, such as a handset exclude switch. While in the On-Hook mode, relay 32 connects the telephone line 14 to ring detection device 34. The DAA 10 can then detect an incoming ring signal by processing the ring voltage appearing across the tip/ring wires of the telephone line 14 using ring detection device 34. Ring detection information is output by ring detection device 34 to optical coupler 20, where optical coupler 20 then transmits the ring detection information to the modem 12.

While operating in the Off-Hook mode, the relay 32 connects the Off-Hook mode components of the DAA 10 to the telephone network through the telephone line 14. A diode bridge 36 may be positioned between the telephone line 14 and Off-Hook mode components in order to full wave rectify the incoming signal from the telephone line 14. In order to perform the Off-Hook mode functions, the DAA 10 selectively connects either an electrical inductor 22 or a pulse dialing circuit 24 to the telephone line 14 using switch 26. The switch 26 is operatively activated by a switching signal S1 transmitted from the modem 12. Switching signal S1 is preferably a binary signal which changes the connection of switch 26 between the electrical inductor 22 and the pulse dialing circuit 24 based upon which one of the two states of the binary signal is transmitted. The pulse dialing circuit 24 is connected to the telephone line 14 when communicating a pulse dialing signal through the telephone line 14 to establish a connection with a remote modem. The electrical inductor 22 is connected to the telephone line 14 at all other times while operating in the Off-Hook mode.

A DC current flowing through the telephone line 14 from the telephone network (PSTN) is passed through the electrical inductor 22 in the DAA 10 to perform dial tone detection as well as to monitor the connection of the modem 12 to the remote modem. The DC current flows through the electrical inductor 22 where it is regulated and returned to the telephone network (PSTN) through the telephone line 14. The electrical inductor 22 performs DC current detection to monitor the DC current on the telephone line 14 in order to detect whether a dial tone is present or when the remote modem breaks its connection (i.e. hangs-up) with the telephone line 14. When the remote modem hangs-up, a sudden drop in the DC current on the telephone line 14 occurs. The electrical inductor 22 detects this change in the DC current on the telephone line and transmits a remote hang-up detection signal to the modem through optical coupler 20, so that the modem 12 is aware that it is free to establish a connection with another remote modem. It is understood that other similar devices for performing DC current detection can be utilized in place of the electrical inductor 22.

In order to configure the DAA 10 to interface properly with a particular country's parameter requirements, the modem 12 will transmit parameter control signals to various parameter-controlled circuitry of the DAA 10. For example, various countries have different parameters for pulse dialing and Off-Hook D.C. loop characteristics. There are currently two different pulse dialing parameters and as many as four different D.C. loop parameters used by the different countries of the world. The discussion of the preferred embodiment of the DAA 10 of the present invention illustrated in FIG. 2 will be hereinafter directed toward programming the DAA 10 to operate with a selected one of these two pulse dialing parameters and a selected one of these four D.C. loop parameters typically used throughout the world. However, it is understood that the DAA 10 of the present invention can be modified to control a greater number of the above-noted parameters or control other telephone network parameters which differ from country to country.

The pulse dialing parameters utilized by the pulse dialing circuit 24 and the DC loop parameters utilized by the electrical inductor 22 are variably programmed by the parameter command signals P1 and P2 transmitted from the modem 12. Parameter command signals P1 and P2 are concurrently communicated to both the pulse dialing circuit 24 and the electrical inductor 22. Since only one of the pulse dialing circuit 24 and the electrical inductor 22 is connected to the telephone line 14 at any instant, the parameter command signals P1 and P2 will only control the parameter settings of one of the circuits 22 and 24 at one time even though both circuits 22 and 24 are concurrently receiving the parameter command signals P1 and P2. The parameter command signals P1 and P2 are preferably binary signals, each having two possible states. Thus, the combination of the two command signals P1 and P2 allows four possible states to be achieved using two signals. Thus, up to four possible different parameters may be achieved in each of the pulse dialing circuit 24 and the electrical inductor 22 using only the two command signals P1 and P2. As discussed previously, there are currently two different pulse dialing parameters and four different D.C. loop parameters used throughout most of the world. The parameter command signals P1 and P2 allow each of these four different D.C. loop parameters to be variably set in the electrical inductor 22 as well as more than allowing for the two different pulse dialing parameters to be variably set in the pulse dialing circuit 24. The relationship between the binary state of the command signals P1 and P2 and the parameters of the DAA 10 are exemplified in the Table 1:

TABLE 1

| DAA Command Signals | | Electrical Inductor 22 | Pulse Dialing Circuit 24 |
|---|---|---|---|
| P1 | P2 | Parameter Description | Parameter Description |
| 0 | 0 | DC loop 1 | |
| 0 | 1 | DC loop 2 | Pulse Dial 1 |
| 1 | 0 | DC loop 3 | Pulse Dial 2 |
| 1 | 1 | DC loop 4 | |

In the above example, the six different parameter settings (two pulse dial and four D.C. loop) typically used throughout the world can be achieved using just the two parameter control signals P1 and P2 in conjunction with switching signal S1, while it is understood that as many as eight different parameter settings could be achieved using parameter control signals P1 and P2 and switching signal S1. All three signals P1, P2 and S1 are preferably binary signals having two states (0 or 1). Depending upon the combination of the states of the signals P1, P2 and S1 received by DAA 10, various parameter settings can be programmed into the DAA 10. Using binary control signals for signals P1, P2 and S1 allows the DAA 10 to be formed with passive control logic, so that various circuits of the DAA 10 do not require powered intelligent components to interpret the control signals received from the modem 12.

Each of the parameter control signals P1 and P2 and the switching signal S1 pass through a respective optical coupler 28 (similar to optical coupler 20) when entering the DAA 10 from the modem 12 in order to provide the required barrier isolation between the modem 12 and the telephone line 14. Using the configuration of the universal DAA 10 of the present invention, only three optical couplers 28 are required for the signals P1, P2 and S1 to program up to eight possible parameter settings in the DAA 10. In the past usage of dedicated components, eight optical couplers 28 would have been required to isolate each of the respective dedicated components providing the various parameter settings. Thus, the universal DAA 10 of the present invention allows a multitude of parameter settings to be programmed into the DAA 10 while significantly reducing the number of optical couplers 28 required to program such parameter settings into the DAA 10 from the modem 12.

As can be seen from the foregoing, a DAA 10 formed in accordance with the present invention allows combined command signals to program multiple parameters into different parameter-controlled circuitry of the DAA. Moreover, by forming a programmable DAA utilizing combined parameter control signals in accordance with the present invention, the cost, size, and complexity of the DAA can be significantly reduced by reducing the number of electrical isolation barrier devices required to be positioned between the DAA and a modem to transmit the various parameter settings to the DAA.

The above embodiment of the DAA 10 is described in conjunction with two parameter control signals P1 and P2 to program D.C. loop parameters and pulse dialing parameters into the DAA 10 with the further use of a switching signal S1 to connect either the electrical inductor 22 or pulse dialing circuit 24 to the telephone line 14. However, it is the intention of the inventors of the present invention that the DAA 10 of the present invention could use parameter control signals to program other possible parameters which differ from country to country. Further, the number of control signals utilized by the DAA 10 could be varied to control any number of parameters as well as to configure any number of circuits in the DAA 10. It is further understood that the DAA 10 can be configured in other possible arrangements using combined command signals to program the parameter settings for a plurality of parameter-controlled circuits.

In each of the above embodiments, the schematic illustration of the programmable DAA of the present invention utilizing combined parameter command signals is described for a preferred embodiment of the DAA. However, it is the full intention of the inventors of the present invention that the DAA may be configured in other possible arrangements, such as configurations where the On-Hook mode components are entirely separate from the Off-Hook mode components. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A programmable data access arrangement for interfacing a data communications device with an external communications line, comprising:

an analog interface circuit;

a signal isolation circuit; and a plurality of control circuits coupled to said analog interface circuit and to said signal isolation circuit, said control circuits configured to receive a plurality of external parameter control signals;

wherein said control circuits are programmably configurable between a plurality of selectable parameter settings for interfacing a data communications device with an external communications line.

2. A method for variably configuring a programmable data access arrangement with parameter settings necessary to interface a data communications device with an external communications line, comprising the steps of:

providing a plurality of control circuits which control the interface operations of the data access arrangement;

transmitting at least one external parameter control signal conjointly to the control circuits; and programmably configuring the control circuits between a plurality of selectable parameter settings for interfacing a data communications device with an external communications line based upon the parameter control signals received by the control circuits.

3. The programmable data access arrangement of claim 1, further comprising a switching device coupling said control circuits to said analog interface circuit, said switching device operatively switching the connection of said analog interface circuit between respective ones of said control circuits.

4. The programmable data access arrangement of claim 3, wherein the switching device is configured to receive an external command signal to control its switching operation.

5. The programmable data access arrangement of claim 1, wherein said signal isolation circuit is connected in a communication path between the data communications device and said control circuits for providing electrical barrier isolation between the data communications device and the data access arrangement.

6. The programmable data access arrangement of claim 5, wherein each of said plurality of external parameter control signals are transmitted to each of said control circuits in parallel with respect to each other, such that each of said control circuits is configured using the same external parameter control signals received by each of the control circuits.

7. The programmable data access arrangement of claim 6, wherein said signal isolation circuit is comprised of a plurality of electrical isolation circuits, each of said external parameter control signals passing through a respective one of said plurality of electrical isolation circuits and then branching off in a parallel manner to each of said control circuits.

8. The programmable data access arrangement of claim 1, wherein said external parameter control signals are binary signals.

9. The programmable data access arrangement of claim 1, wherein said control circuits are passive devices which function without requiring a power source.

10. The programmable data access arrangement of claim 1, wherein said plurality of control circuits includes a pulse dialing circuit.

11. The programmable data access arrangement of claim 1, wherein said plurality of control circuits includes a D.C. loop detection circuit.

12. The method for variably configuring a programmable data access arrangement of claim 2, wherein each one of said plurality of control circuits is separately configurable to a parameter setting different from the other control circuits using the same external parameter control signals conjointly received by all of said control circuits.

13. The method for variably configuring a programmable data access arrangement of claim 2, further comprising the step of passing said external parameter control signals through a signal isolation circuit prior to transmitting said external parameter control signals to said control circuits.

14. The method for variably configuring a programmable data access arrangement of claim 13, wherein said signal isolation circuit provides electrical barrier isolation between the data communications device and the data access arrangement.

15. The method for variably configuring a programmable data access arrangement of claim 2, further comprising the steps of:

providing an analog interface circuit for interfacing the external communications line;

connecting said control circuits to said analog interface circuit through a switching device; and operatively controlling said switching device to switch the connection of said analog interface circuit between respective ones of said control circuits.

16. The method for variably configuring a programmable data access arrangement of claim 15, wherein said switching device is operatively controlled by an external command signal.

17. The method for variably configuring a programmable data access arrangement of claim 14, wherein each of said external parameter control signals are transmitted to each of said control circuits in parallel with respect to each other, such that each of said control circuits is configured using the same external parameter control signals received by each of the control circuits.

18. The method for variably configuring a programmable data access arrangement of claim 17, wherein said signal isolation circuit is comprised of a plurality of electrical isolation circuits, each one of said external parameter control signals being passed through a respective one of said plurality of electrical isolation circuits and then branching off in a parallel manner to each of said control circuits.

19. The method for variably configuring a programmable data access arrangement of claim 2, wherein said external parameter control signals are binary signals.

20. The method for variably configuring a programmable data access arrangement of claim 2, wherein said control circuits are passive devices which function without requiring a power source.

21. The method for variably configuring a programmable data access arrangement of claim 2, wherein said plurality of control circuits includes a pulse dialing circuit.

22. The method for variably configuring a programmable data access arrangement of claim 2, wherein said plurality of control circuits includes a D.C. loop detection circuit.

23. A programmable interface device having variably configurable parameter settings for interfacing a data communications device with an external communications line, comprising:

a data communications device;

a programmable data access arrangement connected between said data communications device and the external communications line; said programmable data access arrangement comprising:

an analog interface circuit for interfacing the external communications line;

a signal isolation circuit connected to said data communications device for providing electrical barrier isolation between said data communications device and said programmable data access arrangement; and a plurality of control circuits coupled to said analog interface circuit and said signal isolation circuit, said control circuits configured to receive a plurality of external parameter control signals;

wherein said control circuits are programmably configurable between a plurality of selectable parameter settings for interfacing said data communications device with the external communications line.

24. The programmable interface device of claim 23, wherein said external parameter control signals are transmitted from said data communications device through said signal isolation circuit to said control circuits.

25. The programmable interface device of claim 23, further comprising a switching device coupling said control circuits to said analog interface circuit, said switching device operatively switching the connection of said analog interface circuit between respective ones of said control circuits.

26. The programmable interface device of claim 25, wherein the switching device is configured to receive an external command signal to control its switching operation.

27. The programmable interface device of claim 24, wherein each of said plurality of external parameter control signals are transmitted to each of said control circuits in parallel with respect to each other, such that each of said control circuits is configured using the same external parameter control signals received by each of the control circuits.

28. The programmable interface device of claim 27, wherein said signal isolation circuit is comprised of a plurality of electrical isolation circuits, each of said external parameter control signals passing through a respective one of said plurality of electrical isolation circuits and then branching off in a parallel manner to each of said control circuits.

29. The programmable interface device of claim 23, wherein said external parameter control signals are binary signals.

30. The programmable interface device of claim 23, wherein said control circuits are passive devices which function without requiring a power source.

31. The programmable interface device of claim 23, wherein said plurality of control circuits includes a pulse dialing circuit.

32. The programmable interface device of claim 23, wherein said plurality of control circuits includes a D.C. loop detection circuit.

* * * * *